US006973527B2

(12) United States Patent
Holzinger

(10) Patent No.: US 6,973,527 B2
(45) Date of Patent: Dec. 6, 2005

(54) ELECTRICAL CIRCUIT FOR A BUS INTERFACE AND/OR A BUS BRIDGE FOR PERFORMING A FUNCTION

(75) Inventor: Bernhard Holzinger, Boblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 314 days.

(21) Appl. No.: 10/356,307

(22) Filed: Jan. 31, 2003

(65) Prior Publication Data

US 2003/0196018 A1 Oct. 16, 2003

(30) Foreign Application Priority Data

Apr. 13, 2002 (EP) .................................. 02008442

(51) Int. Cl.[7] .......................... G06F 13/00; G06F 13/14
(52) U.S. Cl. ...................... 710/305; 710/306; 370/402; 361/683
(58) Field of Search ............................ 710/313, 36, 38, 710/100, 311, 316, 305, 306, 105, 62, 72, 710/240; 370/462, 489, 351, 916, 402; 700/3, 700/9; 711/202; 709/208; 361/683, 722; 708/200

(56) References Cited

U.S. PATENT DOCUMENTS 4,451,891 A * 5/1984 Baba .......................... 701/115
5,148,545 A * 9/1992 Herbst et al. ................ 710/240
5,428,753 A * 6/1995 Kondo et al. ................ 710/107
5,548,730 A * 8/1996 Young et al. ................ 710/100
5,604,748 A * 2/1997 Date et al. ................... 370/449
6,292,863 B1 * 9/2001 Terasaki et al. ............. 710/313
6,430,631 B1 * 8/2002 He et al. ...................... 710/52
6,442,632 B1 * 8/2002 Hayek et al. ................ 710/119

FOREIGN PATENT DOCUMENTS

DE 19819569 A1 11/1999
EP 0929043 A1 7/1999

OTHER PUBLICATIONS

"Reservation arbitrated access for efficient service integration over dual-bus metropolitan area networkds" by Chan, H.C.B., Leung, V.C.M. (abstract only) Publication Date: Oct. 1998.*
"Distributed round-robin and first-come first-serve protocols and their application to multiprocessor bus arbitrary" by Vernon, M.K.; Manber, U. (abstract only) Publication Date: May 30-Jun. 2,1988.*

* cited by examiner

Primary Examiner—Gopal C. Ray

(57) ABSTRACT

An electrical circuit for a bus interface and/or a bus bridge is described. The electrical circuit comprises a global master being coupled with a first bus and at least one function block being coupled with the global master. An address and/or data is transmitted from the first bus to the function block. The function block comprises a application specific functionality for carrying out a function in connection with the received address and/or data.

11 Claims, 2 Drawing Sheets

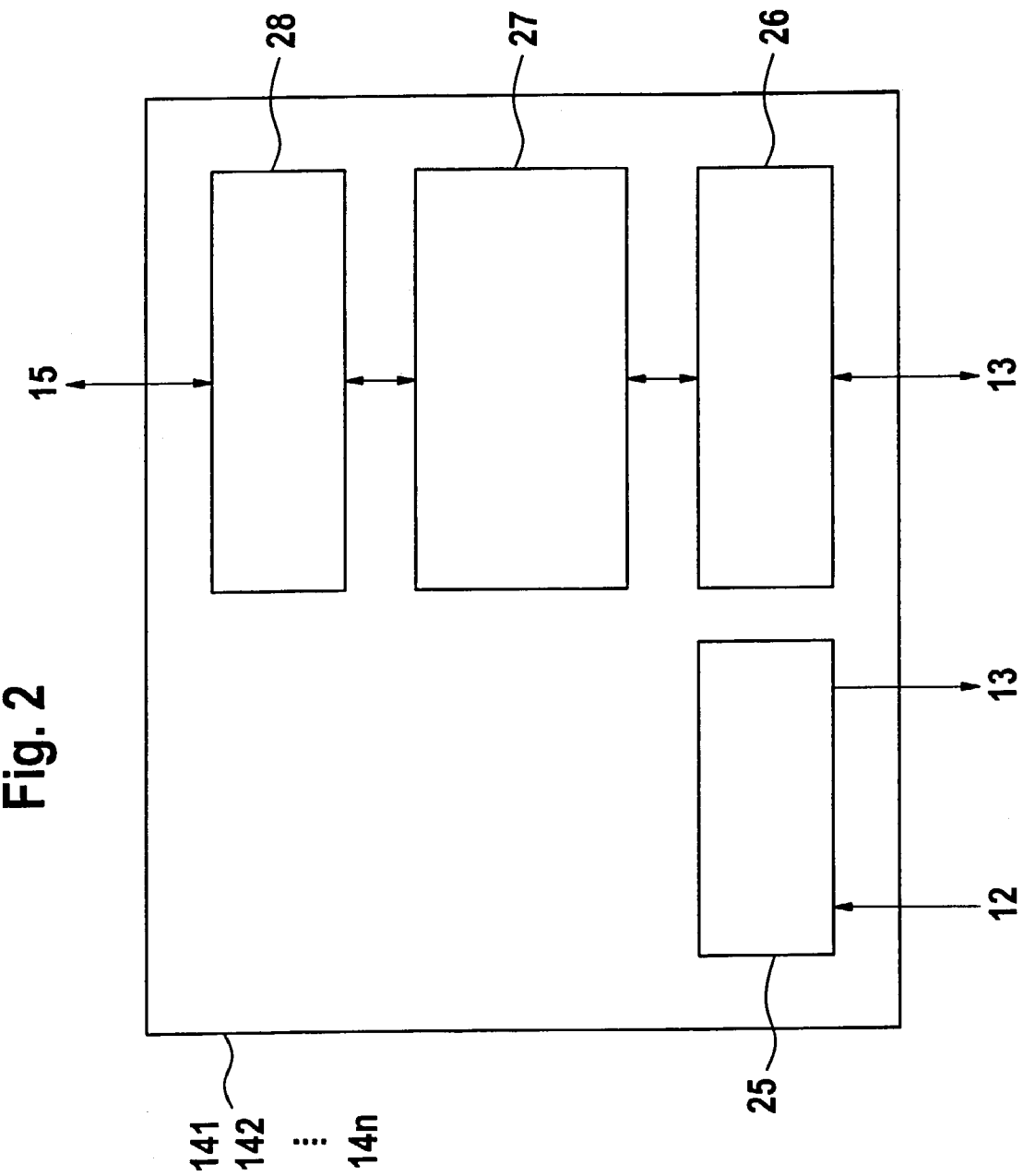

Figure 1:
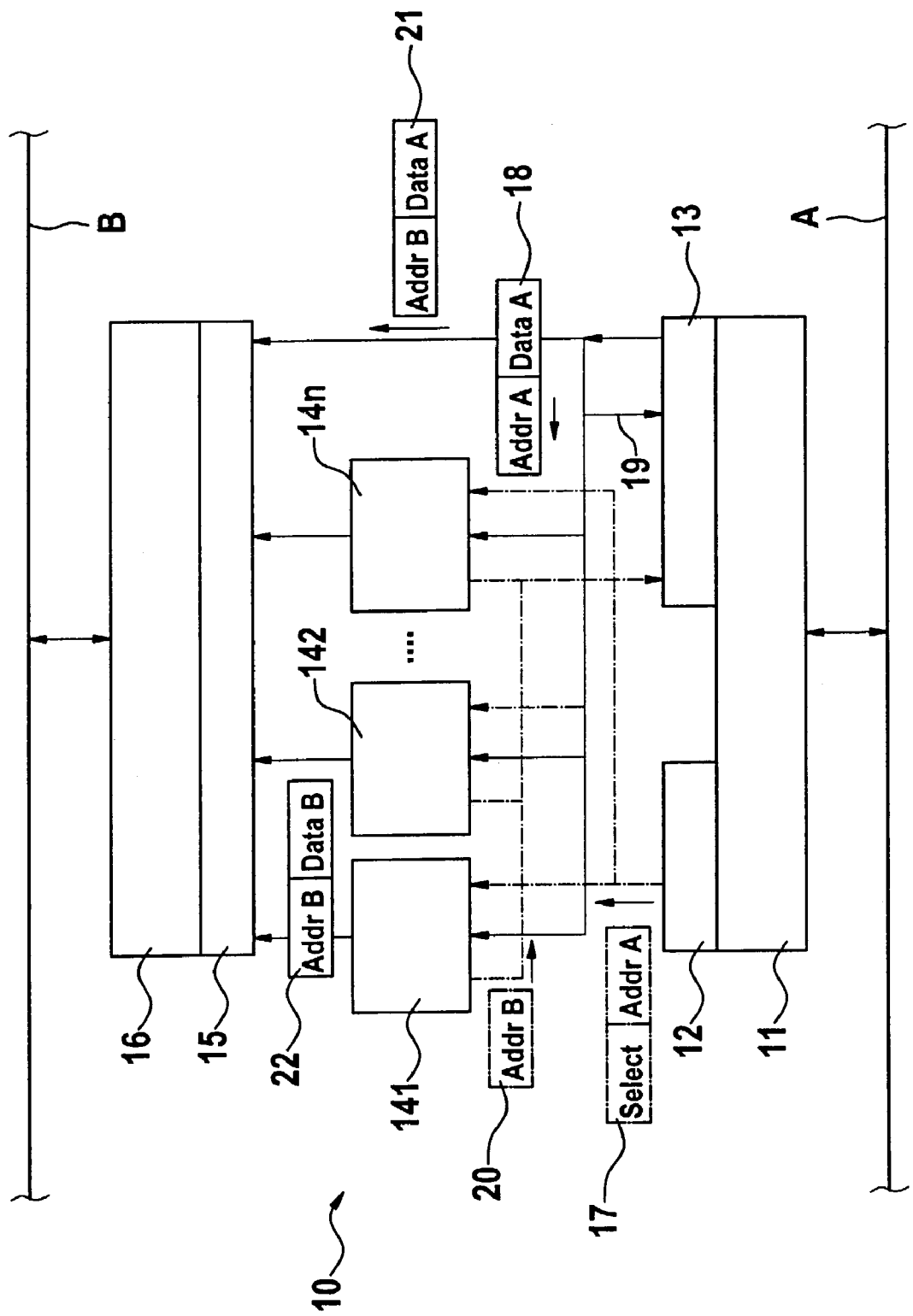

ELECTRICAL CIRCUIT FOR A BUS INTERFACE AND/OR A BUS BRIDGE FOR PERFORMING A FUNCTION

The invention relates to an electrical circuit for a bus interface and/or a bus bridge.

In many applications of personal computers or the like, it is necessary to provide a bus bridge for coupling two buses. As well, bus interfaces are often required to be coupled to a single bus in order to carry out specific functions.

Known bus interfaces and/or bus bridges are specific to their functionality and specific to the busses they are connected to. This imposes an additional design effort if either the functionality has to be changed or added or the interface has to be adapted to different types of busses.

EP-A-929043 discloses a PC card having two interfaces. A circuit for data exchange with an external bus is disclosed in U.S. Pat. No. 6,430,631 (corresponding to DE-A-19819569).

OBJECT AND ADVANTAGES OF THE INVENTION

It is an object of the invention to provide an electrical circuit for a bus interface and/or a bus bridge which may be used for different functions and/or busses. This object is solved by an electrical circuit according to claim 1.

According to the invention, a global master is coupled with a first bus and at least one function block is coupled with the global master. Then, an address and/or data is transmitted from the first bus to the function block. The function block comprises a application specific functionality for carrying out a function in connection with the received address and/or data.

The application specific functionality comprised in the function block is not restricted to a specific function. Instead, the application specific functionality may be adapted to the respective required function. Therefore, the electrical circuit is usable for different purposes with the resulting advantages of flexibility and reduced costs.

Furthermore, the function block as a whole may also be adapted to the specific function to be carried out. For example, the function block may only comprise an address conversion if this is the only required function. Again, this leads to an increased flexibility and reduced costs of the electrical circuit.

The invention therefore provides a structure for an electrical circuit for a bus interface and/or a bus bridge which separates application specific functionality from bus dependent functionality. The electrical circuit of the invention may therefore be easily adapted to different functions and/or busses.

In a first advantageous embodiment of the invention, the application specific functionality of the function block comprises a memory for storing the received address and/or data. In this embodiment, the electrical circuit realizes a bus interface.

In a second advantageous embodiment of the invention, the application specific functionality of the function block allows to convert the received address into a converted address. In this embodiment, the global master may be coupled with a second bus and the converted address may be transmitted from the global master to the second bus. This second embodiment realizes a bus bridge with address conversion.

In a third advantageous embodiment of the invention, the application specific functionality of the function block allows to convert the received address and the received data into a converted address and converted data. In this embodiment, the function block may be coupled with a second bus and the converted address and the converted data may be transmitted from the function block to the second bus. This third embodiment realizes a bus bridge with address and data conversion.

DESCRIPTION OF EMBODIMENTS OF THE INVENTION

The invention together with further objects, advantages, features and aspects thereof will be more clearly understood from the following description taken in connection with the accompanying drawings.

FIG. 1 is a schematic block diagram of an electrical circuit for a bus interface and/or a bus bridge and FIG. 2 is a schematic block diagram of a function block comprised in the electrical circuit of FIG. 1.

FIG. 1 shows an electrical circuit 10 which may be used in connection with digital circuits like processors, memories and the like. The electrical circuit 10 comprises a first protocol layer 11 which is coupled to a bus A. Furthermore, the electrical circuit 10 comprises a function block decoder 12 and a global master 13 which are coupled to the first protocol layer 11.

The first protocol layer 11 provides a protocol conversion between the bus A and the function block decoder 12 and the global master 13. However, the protocol layer 11 does not modify any addresses or data from or to the bus A.

The electrical circuit 10 comprises one or more function blocks 141, 142, 14n which will be described in more detail in connection with FIG. 2.

The function blocks 141, 142, 14n are connected with the function block decoder 12 for receiving a select signal and an address from the function block decoder 12. The function blocks 141, 142, 14n are connected with the global master 13 for transmitting converted addresses to the global master 13.

The function blocks 141, 142, 14n are also connected with the global master 13 for receiving and transmitting addresses and data from and to the global master 13.

The electrical circuit 10 furthermore comprises a multiplexor/arbiter 15 which is coupled to a second protocol layer 16 which is connected to a bus B. The second protocol layer 16 provides a protocol conversion between the bus B and the multiplexor/arbiter 15. However, the protocol layer 16 does not modify any addresses or data from or to the bus B.

The multiplexor/arbiter 15 is connected with the function blocks 141, 142, 14n for receiving converted addresses only from the function blocks 141, 142, 14n. The multiplexor/arbiter 15 is also connected with the function blocks 141, 142, 14n for receiving converted addresses and converted data from the function blocks 141,142, 14n.

In a first operating mode, the electrical circuit 10 is used as a bus interface. For that purpose, the electrical circuit 10 receives an address A and data A from the bus A.

The function block decoder 12 receives the address A and selects one of the function blocks 141, 142, 14n as a function of the received address A. For that purpose, the function block decoder 12 forwards the respective select signal and the address A to all function blocks 141, 142, 14n. This is shown with the help of block 17 and the accompanying arrow in FIG. 1. The global master 13 forwards the address A and the data A to the function blocks 141, 142, 14n. This is shown with the help of block 18 and the accompanying arrow in FIG. 1.

The selected one of the function blocks 141, 142, 14n receives the address A and the data A and carries out the required function.

For example, the selected function block 141, 142, 14n stores the received address A and/or the received data A. Such stored address A and/or data A may be read out of the function blocks 141, 142, 14n with a similar procedure via the global master 13. This is shown by a separate arrow 19 in FIG. 1. The selection of the respective function block 141, 142, 14n is performed by the function block decoder 12 again as a function of the address A received from the bus A.

In a second operating mode, the electrical circuit 10 is used as a bus bridge including an address conversion but no data conversion. For that purpose, the electrical circuit 10 receives an address A and data A from the bus A.

The function block decoder 12 receives the address A and selects one of the function blocks 141, 142, 14n as a function of the received address A. For that purpose, the function block decoder 12 forwards the respective select signal and the address A to all function blocks 141, 142, 14n. This is shown with the help of block 17 and the accompanying arrow in FIG. 1.

The selected one of the function blocks 141, 142, 14n receives the address A and carries out an address conversion. The selected function block 141, 142, 14n then forwards a converted address B back to the global master 13. This is shown with the help of block 20 and the accompanying arrow in FIG. 1.

The global master 13 combines the received converted address B and the original data A and forwards both to the multiplexor/arbiter 15. This is shown with the help of block 21 and the accompanying arrow in FIG. 1. The multiplexor/arbiter 15 forwards the received address B and data A to the second protocol layer 16 and from there to the bus B.

In a third operating mode, the electrical circuit 10 is used as a bus bridge including an address conversion and a data conversion. For that purpose, the electrical circuit 10 receives an address A and data A from the bus A.

The function block decoder 12 receives the address A and selects one of the function blocks 141, 142, 14n as a function of the received address A. For that purpose, the function block decoder 12 forwards the respective select signal and the address A to all function blocks 141, 142, 14n. This is shown with the help of block 17 and the accompanying arrow in FIG. 1. The global master 13 forwards the address A and the data A to the function blocks 141, 142, 14n. This is shown with the help of block 18 and the accompanying arrow in FIG. 1.

The selected one of the function blocks 141, 142, 14n receives the address A and carries out an address conversion. As well, the selected one of the function blocks 141, 142, 14n also receives the data A and carries out a data conversion. The selected function block 141, 142, 14n then forwards a converted address B and converted data B directly to the multiplexor/arbiter 15. This is shown with the help of block 22 and the accompanying arrow in FIG. 1.

The multiplexor/arbiter 15 forwards the received address B and data B to the second protocol layer 16 and from there to the bus B.

As shown in FIG. 2, each one of the function blocks 141, 142, 14n comprises at least one of an address conversion 25, a target interface 26, an application specific functionality 27 and a master interface 28. It is sufficient that the respective function block 141, 142, 14n only comprises those circuits which are necessary for carrying out the required operating mode.

For carrying out the first operating mode, the target interface 26 and the application specific functionality 27 are necessary. As shown in FIG. 2, the target interface 26 is connected with the global master 13 and the application specific functionality 27.

The target interface 26 allows the global master 13 to access the application specific functionality 27 to be carried out. For example, the application specific functionality 27 is a memory with a number of registers for write and read functions. The address A and/or data A received from the global master 13 is then stored in this memory.

For carrying out the second operating mode, the address conversion 25 is necessary. As shown in FIG. 2, the address conversion 25 is connected with the function block decoder 12 for receiving the address A and with the global master 13 for transmitting the converted address B.

For carrying out the third operating mode, the target interface 26, the application specific functionality 27 and the master interface 28 are necessary. As shown in FIG. 2, the master interface 28 is connected with the multiplexor/arbiter 15 and the application specific functionality 27.

Again, the target interface 26 allows the global master 13 to access the application specific functionality 27 to be carried out. In the third operating mode, an address conversion and a data conversion is carried out by the application specific functionality 27. Then, the converted address B and the converted data B is forwarded to the master interface 28 which allows to access the bus B via the multiplexor/arbiter 15. Such access of the bus B may be dependant or independent of an access to bus A.

All three operating modes may be present within one and the same electrical circuit 10. In this case, different ones of the function blocks 141, 142, 14n may be directed to different operating modes.

The multiplexor/arbiter 15 is provided for ensuring that no conflicts occur if different ones of the function blocks 141, 142, 14n try to access the bus B simultaneously. Furthermore, the multiplexor/arbiter 15 allows to access the bus B independently from any access to bus A.

The described electrical circuit 10 may be used in a personal computer or in a workstation of a server or a client. The electrical circuit 10 may also be used in a remote service system e.g. for a server. In this case, the server is connected with the bus A and the remote service system is connected with the bus B.

What is claimed is:

1. An electrical circuit for a bus interface and/or a bus bridge comprising:
    a global master being coupled with a first bus and at least one function block being coupled with the global master, wherein an address and/or data is transmitted from the first bus to the function block and wherein the function block comprises an application specific functionality for carrying out a function in connection with the received address and/or data, and
    a function block decoder being coupled with the first bus and the function blocks for receiving the address from the first bus and for selecting one function block out of a number of function blocks as a function of the address.

2. The electrical circuit of claim 1 wherein the application specific functionality of the function block comprises a memory for storing the received address and/or data.

3. The electrical circuit of claim 1 wherein the application specific functionality of the function block allows to convert the received address into a converted address.

4. The electrical circuit of claim 3 further comprising: an address conversion for converting the received address into the converted address.

5. The electrical circuit of claim 3 wherein the global master being coupled with a second bus and wherein the converted address is transmitted from the global master to the second bus.

6. The electrical circuit of claim 1 wherein the application specific functionality of the function block allows to convert the received address and the received data into a converted address and converted data.

7. The electrical circuit of claim 6 wherein the function block being coupled with a second bus and wherein the converted address and the converted data is transmitted from the function block to the second bus.

8. The electrical circuit of claim 5 further comprising: a multiplexor/arbiter being coupled with the global master, with the function blocks and with the second bus for allowing a simultaneous access from the global master and/or the function blocks to the second bus.

9. The electrical circuit of claim 7 further comprising: a multiplexor/arbiter being coupled with the global master, with the function blocks and with the second bus for allowing a simultaneous access from the global master and/or the function blocks to the second bus.

10. The electrical circuit of claim 1 further comprising: a first protocol layer being coupled with the first bus and the global master.

11. The electrical circuit of claim 10 further comprising: a second protocol layer being coupled with the second bus and the multiplexor/arbiter.

* * * * *